United States Patent [19]

Shimotsuma et al.

[11] 3,937,754
[45] Feb. 10, 1976

[54] BIAXIALLY ORIENTED POLYETHYLENE-2,6-NAPHTHALATE FILM CONTAINING ANOTHER POLYESTER RESIN AND PROCESS FOR ITS PRODUCTION

[75] Inventors: Sakae Shimotsuma; Takeo Asai; Masahiro Hosoi, all of Sagamihara; Hiroshi Aoki; Masanori Masuda, both of Ogaki, all of Japan

[73] Assignee: Teijin Ltd, Osaka, Japan

[22] Filed: July 23, 1973

[21] Appl. No.: 381,580

[30] Foreign Application Priority Data

July 25, 1972 Japan.............................. 47-73803

[52] U.S. Cl. ................ 260/860; 427/386; 428/480; 252/62; 252/63; 264/210 R
[51] Int. Cl.² ........................................ C08G 39/02
[58] Field of Search......... 260/860; 264/210 R, 289, 264/75 R

[56] References Cited
UNITED STATES PATENTS 3,546,320   12/1970   Duling et al. ...................... 260/860
3,720,732   3/1973   Sevenich .......................... 260/860

*Primary Examiner*—Donald E. Czaja
*Assistant Examiner*—T. Pertilla
*Attorney, Agent, or Firm*—Sherman & Shalloway

[57] ABSTRACT

A biaxially oriented polyethylene-2,6-naphthalate film, which comprises a blended mixture of
1. a polyethylene-2,6-naphthalate resin which may contain a unit derived from not more than 10mol% of a polyester-forming component other than a polyethylene-2,6-naphthalate-forming component, and
2. 0.5 to 10% by weight, based on the polyethylene-2,6-naphthalate resin (1), of a polyester resin other than the polyethylene-2,6-naphthalate resin (1) in which the amount of the homopolyester unit is at least 90 mol%, said film having a softing point at least 1°C. higher than the its equilibrium softening point, and a process for its production.

3 Claims, No Drawings

BIAXIALLY ORIENTED POLYETHYLENE-2,6-NAPHTHALATE FILM CONTAINING ANOTHER POLYESTER RESIN AND PROCESS FOR ITS PRODUCTION

This invention relates to a biaxially oriented polyethylene-2,6-naphthalate film containing a polyester resin other than polyethylene-2,6-naphthalate in an amount of 0.5 to 10% by weight based on the polyethylene-2,6-naphthalate, and a process for its production. This film has markedly improved Young's modulus and thermal resistance while retaining the superior electrical insulation of the polyethylene-2,6-naphthalate.

A melt-shaped biaxially oriented film of polyethylene-2,6-naphthalate resin which may contain a unit derived from not over 10 mol% of a polyester forming component other than a polyethylene-2,6-naphthalate-forming component is disclosed in published Germany application P 2163963.4. A polyethylene-2,6-naphthalate copolymer having copolymerized with not more than 10 mol% of a polyester-forming component other than the polyethylene-2,6-naphthalate-forming component retains good thermal resistance of a polyethylene-2,6-naphthalate homopolymer, and has excellent electrically insulating characteristics.

Further study has led to the discovery that a biaxially oriented polyethylene-2,6-naphthalate film, which comprises a blended mixture of 1. a polyethylene-2,6-naphthalate resin which may contain a unit derived from not more than 10 mol% of a polyester-forming component other than a polyethylene-2,6-naphthalate-forming component, and
2. a polyester resin in an amount of 0.5 to 10% by weight based on the polyethylene-2,6-naphthalate resin (1) in which the homopolyester unit other than the polyethylene-2,6-naphthalate resin (1) is contained in an amount of at least 90 mol%, the softening point of the film being at least 1°C. higher than the equilibrium softening point of the film, has markedly improved resistance to thermal degradation, especially that shown by break elongation after the film has been exposed to high temperatures for long periods of time, for example, 200°C. for 400 hours, and improved Young's modulus.

According to the work of the inventors, when the polyethylene-2,6-naphthalate resin (1) is blended in the molten state with the polyester resin (2), the softening point of the blended mixture decreases gradually from the softening point of the polyethylene-2,6-naphthalate resin (1), and finally, reaches a certain point. This certain point is referred to as an equilibrium softening point, and it has been found that this softening point coincides with the softening point of a polyethylene-2,6-naphthalate copolymer obtained by copolymerising monomers of the same composition and proportion as the monomers which constitute the polyethylene-2,6-naphthalate resin (1) and the polyester resin (2). From this fact, the inventors presume that reaction occurs between the polyethylene-2,6-naphthalate resin (1) and the polyester resin (2), and there is a stage of forming a block copolymer, and finally a random copolymer will be obtained which is the same as that may be obtained by copolymerization.

The work of the inventors has led to the discovery that the improvement in resistance to thermal degradation and Young's modulus is achieved after the softening point of the polyethylene-2,6-naphthalate resin has decreased and before it decreases to a point at least 1°C. higher than the equilibrium softening point, and that the improvement will be substantially lost when the softening point reaches the equilibrium softening point.

It is an object of this invention to provide a novel and useful film having improved resistance to thermal degradation and Young's modulus over films prepared from a polyethylene-2,6-naphthalate homopolymer and a polyethylene-2,6-naphthalate copolymer.

Other objects of this invention along with its advantages will become more apparent from the following description.

The polyethylene-2,6-naphthalate resin (1) to be used as a major polymer in the blended mixture may be any polymer in which at least 90 mol% of the structural units are ethylene-2,6-naphthalate units. Thus, the term "polyethylene-2,6-naphthalate resin (1)", used in this specification and appended claims, denotes not only a homopolymer of ethylene-2,6-naphthalate but also a polyethylene-2,6-naphthalate modified with less than 10 mol%, preferably less than 5 mol%, of a polyester-forming component other than a polyethylene-2,6-naphthalate-forming component.

In general, the polyethylene-2,6-naphthalate (1) is prepared by reacting naphthalene-2,6-dicarboxylic acid or its functional derivatives with ethylene glycol or its functional derivatives in the presence of a catalyst. The reaction conditions and operating procedures have been known in the art and are disclosed for example, in British Patent No. 604,073 and U.S. Pat. No. 3,161,710. Where the polyester-forming component is used in an amount of less than 10 mol%, one or more suitable comonomers or modifiers are added to the polymerization system before the completion of the reaction of forming the polyethylene-2,6-naphthalate resin (1), and then the reaction is completed to form a copolyester.

The comonomer or modifier may be a compound having a divalent ester-forming functional group. Examples of this compound are dicarboxylic acids such as oxalic acid, adipic acid, phthalic acid, isophthalic acid, terephthalic acid, naphthalene-1,5-dicarboxylic acid, naphthalene-1,6-dicarboxylic acid, naphthalene-2,7-dicarboxylic acid, succinic acid, diphenyl ether dicarboxylic acid and lower alkyl esters of these dicarboxylic acids; hydroxycarboxylic acids such as p-hydroxybenzoic acid and p-hydroxyethoxybenzoic acid, and lower alkyl esters of these hydroxycarboxylic acids; and dihydric alcohols such as trimethylene glycol, tetramethylene glycol, hexamethylene glycol, or neopentyl glycol. The polyethylene-2,6-naphthalate or its modified product may have terminal hydroxyl and/or carboxyl groups capped with a monofunctional compound such as benzoic acid, benzoyl benzoic acid, benzyloxybenzoic acid or methoxypolyalkylene glycol. The polyethylene-2,6-naphthalate modified with a very small amount of a polyfunctional compound such as glycerol and pentaerythritol to such an extent that the linearity of the polymer is not substantially lost can also be used.

The polyester resin (2) to be used as a minor polymer in the blended mixture is a polyester resin in which the homopolyester unit is contained in an amount of at least 90 mol%. Examples of this polyester are those derived from a dicarboxylic acid component selected from terephthalic acid, isophthalic acid, adipic acid, oxalic acid, succinic acid, naphthalene-2,6-dicarboxylic acid, naphthalene-2,7-dicarboxylic acid, naphthalene-1,5-dicarboxylic acid, 4,4-diphenoxyethane dicarboxylic acid, 4,4'-tetramethylene diphenyl dicarboxylic acid, and functional derivatives thereof and a glycol component selected from ethylene glycol, trimethylene glycol, tetramethylene glycol, hexamethylene glycol, neopentyl glycol, and functional derivatives thereof. The functional derivatives may, for example, be lower alkyl esters of the carboxylic acids, as illustrated with respect to the polyethylene-2,6-naphthalate.

The comonomer of modifier that can occupy not more than 10 mol% of units constituting the polyester resin (2) may, for example, be (a) dicarboxylic acids and glycols other than those described above as components which form at least 90 mol% of the above unit; (b) the compounds illustrated as the comonomer or modifier in the polyethylene-2,6-naphthalate resin (1), except the dicarboxylic acids and glycols (a) above; and (c) naphthalene-2,6-dicarboxylic acid and an ester-forming functional derivative thereof such as its lower alkyl ester.

The polyester resin (2) to be used as the minor polymer in the blended mixture may be any polyester illustrated above. Especially when the film of this invention is used as an electrically insulating material, it is preferred to select polyester resins (2) not containing a tertiary proton in their structural units.

It is possible to incorporate in the polyethylene-2,6-naphthalate resin (1) and/or polyester resin (2) various additives known in the field of film preparation. Examples of the additives are a delustering agent such as titanium dioxide, a stabilizer such as phosphoric acid, phosphorous acid and esters of these acids, and a slip agent such as finely divided silica and china clay.

Desirably, the polyethylene-2,6-naphthalate used in this invention has an intrinsic viscosity of 0.35 to 0.80, preferably 0.45 to 0.80, because polymers having intrinsic viscosities in this range exhibit good processabiluty when shaped into films. It is desirable that the polyester resin (2) have an intrinsic viscosity of at least 0.25, prefeably at least 0.35. The higher the intrinsic viscosity, the better. Those having a melt viscosity of not more than 40,000 poises at a temperature 20°C. higher than the melting point of the polyester resin (2) are preferred.

The intrinsic viscosity, as referred to in this specification and claims, is measured on an o-chlorophenol solution of polymer at 35°C. and expressed in 100 cc/g.

The film of this invention can be produced by melt-shaping a mixture of (1) a polyethylene-2,6-naphthalate resin which may contain a unit derived from not more than 10 mol% of a polyester-forming component other than a polyethylene-2,6-naphhhalate-forming component and (2) 0.5 to 10% by weight, based on the polyethylene-2,6-naphthalate resin (1), of a polyester resin other than the above polyethylene-2,6-naphthalate resin, in which the amount of the homopolyester unit is at least 90 mol%, into a film so that the softening point of the resulting film is at least 1°C. higher than the equilibrium softening point of the film, biaxially orienting the resulting unstretched film, and if desired, heat-treating the stretched film.

In the present invention, the biaxially oriented and post heat-treated film, the biaxially oriented and not post heat-treated film and the unstretched film have the same softening point, and also the same equilibrium softening point. These values of the unstretched film do not change during biaxial orientation and post heat-treatment, probably because no chemical reaction occurs during the operation which may cause a reduction in the softening point of the blended mixture.

The melt-shaping of the mixture into a film under conditions such that the softening point of the film is at least 1°C. higher than the equilibrium softening point of the film means that the heat history of the mixture during the formation of the blended mixture and during the melt shaping is not sufficient to reduce the softening point of the resulting film to the range between its equilibrium softening point and a temperature 1°C. higher than it. The heat history is a factor of temperature and time, and can be experimentally determined by prescribing the blending and molding conditions for a certain mixture.

The film may be formed by pre-melting the blend components (1) and (2) to form a blended mixture in the form of molding pellets or chips and then melt-shaping this mixture. Or the blend components (1) and (2) are fed into a melt-extruder in various forms such as powder, pellet or chip in the premixed state or simultaneously, and blended while being melt-extruded.

Preferably, prior to melt-shaping, the polyethylene-2,6-naphthalate resin (1) and the polyester resin (2) are dried for at least 10 minutes, preferably at least 30 minutes, at a temperature of at least 120°C. and up to 10°C. under the melting point of the polyethylene-2,6-naphthalate (1) or the polyester resin (2) (whichever is lower).

The amount of the polyester resin (2) used as a minor component in the blended mixture is 0.5 to 10 % by weight, preferably 1 to 7 % by weight, more preferably 1 to 5 % by weight, based on the polyethylene-2,6-naphthalate resin (1). If the amount is less than 0.5 % by weight, there is no effect of mixing the polyester (2) and if it exceeds 10 % by weight, the resistance to thermal degradation and Young's modulus of the film obtained become poor.

An unstretched film to be used for formation of the biaxially oriented film may be prepared according to customary methods adopted for film formation in the art. Usually, the above-described blended mixture is melt shaped into an unstretched film at a temperature ranging from the melting point of the polyethylene-2,6-naphthalate resin (1) and polyester resin (2) (whichever is higher) to a temperature 60°C. higher than this melting point. The resulting unstretched film is then biaxially oriented.

Preferably, the biaxial orientation treatment is performed by stretching the unstretched film in the extrusion direction of the unstretched film to, for example, at least 2.5 times to 5.5 times the original length of the unstretched film in the extrusion direction at a temperature of (the second order transition temperature of the unstretched film + 10°C.) to 170°C., and in a direction across the extrusion direction of the unstretched film to, for example, 2.5 times to 5.5 times the original length in the direction across the extrusion direction at a temperature of (the second order transition temperature of the unstretched film + 3°C.) to 160°C. The biaxially stretching temperature is preferably higher in the stretching in the extrusion direction than in the stretching in the direction across the extrusion direction.

The second order transition point is an inflection point in the measurement of differential scanning calorimetry.

The biaxially oriented polyethylene-2,6-naphthalate film can, if desired, be post heat-treated. This heat-treatment can be performed under conditions not allowing free shrinkage of the film, for example, under relaxation allowing restricted shrinkage, or under tension at constant length, at a temperature, preferably, of 170°C. to the melting point of the film, preferably 170°C. to 10°C. at the melting point of the film.

The polyethylene-2,6-naphthalate film produced in accordance with this invention has mechanical properties and electrical characteristics not inferior to those of a film of an ordinary polyethylene-2,6-naphthalate not blended with the polyester (2), and have markedly improved resistance to thermal degradation and Young's modulus. The thickness of the film can be changed as desired, but usually it is about 2 to 400 microns. The film may, of course, be in such a form as tape or band.

The biaxially oriented and post heat-treated films of this invention may be used directly as insulating materials for various electric and electronic machines, for example, as tapings for electric and electronic machines, materials for slot insulation for stage-phase insulation, condenser building materials, magnetic recording tapes-supports or photographic base films. Furthermore, they may be laminated with other insulating materials such as cloth, paper, glass and other inorganic substances, or may be used in the form of composite products.

The films of this invention obtained without post heat-treatment are useful as packaging and insulating heat-shrinkage films.

This invention will be described in greater detail by the following Examples and Comparative Examples.

The tensile mechanical properties (break strength, break elongation and Young's modulus) were determined at 23°C. in an atmosphere having a relative humidity of 65%, using an Instron-type tensile tester under the following conditions:
Form of the sample: strip (15 cm × 1 cm)
Distance between chucks: 10 cm
Rate of pulling: 10 cm/min.

The breakdown voltage (BDV) was measured as follows:

By using a couple of disc-shaped electrodes of 25 mm diameter the voltage of an alternating current is raised up to the breakdown of film at a constant rate, i.e., 1 KV/sec.

The softening point was measured as follows:

The sample for measurement should be non-oriented and amorphous. Accordingly, a biaxially oriented film or a biaxially oriented and heat-treated film is melted for a very short time (preferably less than 3 minutes) during which no substantial change in softening point occurs, at a temperature ranging from the melting point of the film to a temperature 20°C. higher than the melting point of the film and then rapidly cooled to render it non-oriented and amorphous in order to use it as the sample. An unstretched film may be used as such. The sample was heat-treated at 190°C. for 60 minutes, and its softening point was determined by penetrometry. The rate of temperature raise was 1.2°C. per minute.

EXAMPLE 1 AND COMPARATIVE EXAMPLE 1

Dried polyethylene-2,6-naphthalate resin (1) having an intrinsic viscosity of 0.62 was melt extruded through a T die at 300°C. and rapidly cooled on a casting drum held at 60°C. to form a 330 micron-thick unstretched film (Run No. 1).

On the other hand, the above polyethylene-2,6-naphthalate (1) was mixed with each of the polyester resins (2) indicated in Table 1 using a V-type blender, and the mixture was dried. The dried mixture was melt-extruded at 295°C. through a T die, and rapidly cooled on a casting drum held at 60°C. to form an unstretched film having a thickness of 335 microns. Each of the polymer was maintained in the molten state for about 7 minutes. (Runs Nos. 2 to 4, 6 to 10, 12 to 17, and 18 to 21)

Run No. 1 was repeated except using a polymer having an intrinsic viscosity of 0.62 and having copolymerized therewith 2 mol% of ethylene-2,7-naphthalate structural units, a polymer having an intrinsic viscosity of 0.61 and having copolymerized therewith 3 mol% of tetramethylene-2,6-naphthalate structural units, and a polymer having an intrinsic viscosity of 0.60 and having copolymerized therewith 3.5 mol% of ethylene terephthalate units. (Runs Nos. 5, 9 and 22)

The stretching and heat-setting conditions were as follows for all the films. Longitudinal stretching temperature 140°C., longitudinal stretching ratio 3.5, transverse stretching temperature 130°C., the transverse stretch ratio 3.7, heat-setting temperature 235°C. and heat-setting time 15 seconds.

Run No. 2 was repeated except that polyester resin (2) of various intrinsic viscosities was used (Runs Nos. 23 – 32).

The mechanical and electrical properties of the films obtained above are shown in Table 1.

Table 1

| Run No. | | Polyester resin (2) Type | ($\eta$) | Proportion of polyester resin (2) based on 2,6-PEN resin (1) to be mixed (wt%) | Elongation at breakage (%) after heat degradation LD | WD | Breaking strength (kg/cm$^2$) × 10$^3$ of resulting films after heat degradation* LD | WD | Dielectric strength (KV/mm) of resulting films after heat degradation* | Young's modulus (kg/cm$^2$) × 10$^4$ of resulting films LD | WD | Softening point (°C.) of resulting films | Equilibrium softening-point of resulting films (°C.) |
|---|---|---|---|---|---|---|---|---|---|---|---|---|---|
| 1 | Comparison | — | — | 0 | 28 | 33 | 1.45 | 1.41 | 287 | 5.65 | 6.38 | 270.9 | 270.9 |
| 2 | Invention | Poly(ethylene-2,7-naphthalate) | 0.51 | 2 | 78 | 88 | 1.46 | 1.43 | 285 | 7.18 | 6.95 | 268.7 | 266.5 |
| 3 | " | " | 0.51 | 6 | 63 | 58 | 1.41 | 1.43 | 290 | 6.93 | 7.02 | 265.2 | 255.3 |
| 4 | Comparison | " | 0.51 | 13 | 19 | 23 | 1.35 | 1.37 | 287 | 5.31 | 5.82 | 261.8 | 241.8 |
| 5 | " | " | — | 2 (copolymerized) | 27 | 31 | 1.45 | 1.42 | 285 | 5.74 | 6.21 | 266.6 | 266.6 |
| 6 | Invention | Poly(tetramethylene-2,6-naphthalate) | 0.53 | 2 | 57 | 59 | 1.44 | 1.40 | 291 | 7.33 | 7.12 | 270.0 | 266.2 |

Table 1-continued

| Run No. | | Polyester resin (2) Type | ($\eta$) | Proportion of polyester resin (2) based on 2,6-PEN resin (1) to be mixed (wt%) | Elongation at breakage (%) after heat degradation LD | WD | Breaking strength (kg/cm$^2$) × 10$^3$ of resulting films after heat degradation* LD | WD | Dielectric strength (KV/mm) of resulting films after heat degradation* | Young's modulus (kg/cm$^2$) × 10$^4$ of resulting films LD | WD | Softening point (°C.) of resulting films | Equilibrium softening-point of resulting films (°C.) |
|---|---|---|---|---|---|---|---|---|---|---|---|---|---|
| 7 | " | " | 0.53 | 8 | 50 | 48 | 1.41 | 1.41 | 285 | 6.43 | 6.59 | 263.9 | 251.0 |
| 8 | Comparison | " | 0.53 | 13 | 21 | 15 | 1.31 | 1.33 | 293 | 5.02 | 5.66 | 262.0 | 240.8 |
| 9 | " | — | — | 3.3 (copolymerized) | 29 | 30 | 1.47 | 1.41 | 288 | 5.56 | 6.14 | 266.4 | 266.4 |
| 10 | Invention | Poly(ethylene-1,5-naphthalate) | 0.65 | 3 | 83 | 74 | 1.45 | 1.43 | 286 | 7.37 | 6.87 | 269.4 | 264.3 |
| 11 | Comparison | Poly(ethylene-1,5-naphthalate) | 0.65 | 13 | 13 | 22 | 1.33 | 1.31 | 287 | 5.32 | 5.63 | 260.8 | 240.3 |
| 12 | Invention | Poly(hexamethylene-2,6-naphthalate) | 0.49 | 3 | 65 | 53 | 1.43 | 1.40 | 290 | 6.75 | 6.96 | 269.1 | 263.7 |
| 13 | Comparison | " | 0.49 | 13 | 18 | 21 | 1.31 | 1.34 | 290 | 5.57 | 5.49 | 260.2 | 240.5 |
| 14 | Invention | Poly(tetramethylene terephthalate) | 0.60 | 3 | 53 | 73 | 1.38 | 1.39 | 285 | 7.25 | 7.21 | 270.1 | 264.1 |
| 15 | Comparison | " | 0.60 | 13 | 17 | 13 | 1.26 | 1.29 | 286 | 5.48 | 6.02 | 260.0 | 241.0 |
| 16 | Invention | Polyethylene oxalate | 0.50 | 3 | 49 | 45 | 1.39 | 1.43 | 288 | 6.83 | 6.99 | 269.6 | 264.4 |
| 17 | Comparison | " | 0.50 | 13 | 17 | 19 | 1.27 | 1.25 | 287 | 5.22 | 56.4 | 259.7 | 240.9 |
| 18 | Invention | Polyethylene terephthalate | 0.75 | 2 | 77 | 83 | 1.45 | 1.39 | 283 | 7.41 | 7.01 | 268.8 | 266.5 |
| 19 | " | " | 0.75 | 5 | 98 | 69 | 1.24 | 1.35 | 275 | 7.00 | 7.25 | 266.7 | 256.4 |
| 20 | Invention | Polyethylene terephthalate | 0.75 | 8 | 56 | 40 | 1.31 | 1.36 | 280 | 6.77 | 6.83 | 264.3 | 251.3 |
| 21 | Comparison | " | 0.75 | 13 | 23 | 26 | 1.35 | 1.33 | 272 | 5.35 | 5.89 | 261.7 | 239.8 |
| 22 | " | — | — | 2.8 (copolymerized) | 30 | 35 | 1.46 | 1.43 | 285 | 6.33 | 5.80 | 265.5 | 265.5 |
| 23 | Invention | Polyethylene isophthalate | 0.53 | 3 | 62 | 58 | 1.39 | 1.40 | 283 | 7.32 | 7.51 | 267.3 | 263.2 |
| 24 | " | Polytetramethylene isophthalate | 0.49 | 3 | 56 | 59 | 1.43 | 1.37 | 288 | 6.84 | 7.01 | 266.8 | 262.3 |
| 25 | " | Polyethylene succinate | 0.46 | 3 | 37 | 45 | 1.33 | 1.39 | 279 | 6.73 | 6.77 | 262.1 | 257.0 |
| 26 | " | Polyethylene-4,4'-diphenoxy ethane dicarboxylate | 0.38 | 3 | 51 | 53 | 1.39 | 1.41 | 278 | 6.85 | 6.69 | 260.9 | 255.7 |
| 27 | Invention | Polyneopentyl-2,6-naphthalate | 0.51 | 3 | 89 | 79 | 1.37 | 1.47 | 280 | 7.31 | 7.48 | 268.0 | 265.8 |
| 28 | " | Polytrimethylene-2,6-naphthalate | 0.63 | 3 | 67 | 70 | 1.43 | 1.38 | 281 | 7.15 | 7.23 | 268.0 | 265.1 |
| 29 | " | Polytetramethylene-1,5-naphthalate | 0.56 | 3 | 73 | 58 | 1.40 | 1.43 | 282 | 7.10 | 7.29 | 267.3 | 264.3 |
| 30 | " | Polyethylene-1,6-naphthalate | 0.62 | 3 | 69 | 66 | 1.45 | 1.45 | 285 | 7.01 | 7.25 | 267.6 | 265.4 |
| 31 | " | Polyhexamethylene terephthalate | 0.55 | 3 | 54 | 71 | 1.45 | 1.47 | 280 | 7.30 | 7.33 | 269.0 | 266.0 |
| 32 | " | Polyethylene-4,4'-tetramethylene diphenyl dicarboxylate | 0.56 | 3 | 57 | 49 | 1.47 | 1.43 | 283 | 7.21 | 2.35 | 268.3 | 266.3 |

*Conditions for heat degradation, 200°C., 400 hours, under free shrinkage
LD: Lengthwise direction
WD: Widthwise direction

EXAMPLE 2

Poly(tetramethylene-2,6-naphthalate) was mixed in an amount of 2% by weight and 5% by weight with 2,6-PEN resin (1) having an intrinsic viscosity of 0.63. Each of the mixtures was melt-extruded, and the resulting unstretched film was stretched and heat-set under the same conditions as in Run No. 1. (Runs Nos. 33 and 34)

Polyethylene terephthalate having copolymerized therewith 2 mol% of naphthalene-2,7-dicarboxylic acid was mixed in an amount of 2, 5 andd 13 % by weight with 2,6-PEN resin (1) ([$\eta$] = 0.65) having copolymerized therewith 3 mol% of tetramethylene glycol. Each of the mixtures was melt-extruded, and the resulting unstretched film was stretched and heat-set under the same conditions as in Run No. 1. (Runs Nos. 35, 36 and 37).

Polyethylene terephthalate (2% by weight) and poly (tetramethylene-1,5-naphthalate) (2% by weight) were mixed with 2,6-PEN resin (1) having an intrinsic viscosity of 0.63. The mixture was melt-extruded, and the resulting unstretched film was stretched and heat-set under the same conditions as in Run No. 1. (Run No. 38).

The physical properties of the resulting film are shown in Table 2.

Table 2

| Run No. | Polyester resin (2) Type | (η) | Proportion of polyester resin (2) based on 2,6-PEN resin (1) to be mixed (wt%) | Elongation at breakage (%) LD | WD | Breaking strength (kg/cm²) × 10³ of resulting films after heat degradation* LD | WD | Dielectric strength (KV/mm) of resulting films after heat degradation* | Young's modulus (kg/cm²) × 10⁴ of resulting films LD | WD | Softening point (°C.) of resulting films | Equilibrium softening point of resulting films (°C.) |
|---|---|---|---|---|---|---|---|---|---|---|---|---|
| 33 | Poly(tetramethylene-2,6-naphthalate) | 0.55 | 2 | 65 | 77 | 1.45 | 1.43 | 288 | 7.23 | 6.83 | 260.8 | 254.1 |
| 34 | " | 0.55 | 5 | 58 | 67 | 1.38 | 1.43 | 289 | 6.77 | 6.91 | 255.9 | 247.6 |
| 35 | Poly(ethylene terephthalate) | 0.68 | 2 | 51 | 69 | 1.40 | 1.47 | 279 | 6.96 | 6.77 | 261.3 | 255.7 |
| 36 | " | 0.68 | 5 | 48 | 46 | 1.37 | 1.34 | 283 | 6.62 | 6.73 | 256.4 | 249.6 |
| 37 | " | 0.68 | 13 | 7 | 8 | 1.32 | 1.33 | 273 | 5.32 | 5.54 | 247.1 | 233.3 |
| 38 | Poly(ethylene terephthalate) / Poly(tetramethylene-1,5-naphthalate) | 0.65 / 0.53 | 2 / 1.5 | 60 | 63 | 1.43 | 1.41 | 285 | 7.11 | 7.21 | 256.2 | 247.9 |

*Conditions for heat degradation, 200°C., 400 hours, under free shrinkage

What we claim is:

1. A biaxially oriented polyethylene-2,6-naphthalate film, which comprises a blended mixture of
   1. a polyethylene-2,6-naphthalate resin having a unit derived from not more than 10 mol % of a polyester-forming component other than a polyethylene-2,6-naphthalate-forming component, and (2) 0.5 to 10% by weight, based on the polyethylene-2,6-naphthalate resin (1), of a polyester resin other than the polyethylene-2,6-naphthalate resin (1) which contains at least 90 mol % of units derived from a dicarboxylic acid component selected from the group consisting of terephthalic acid, isophthalic acid, adipic acid, oxalic acid, succinic acid, naphthalene-2,6-dicarboxylic acid, naphthalene-2,7-dicarboxylic acid, naphthalene-1,5-dicarboxylic acid, 4,4'-diphenoxyethane dicarboxylic acid, 4,4'-tetramethylene diphenyl dicarboxylic acid and lower alkyl ester functional derivatives of these acids, and a glycol component selected from the group consisting of ethylene glycol, trimethylene glycol, tetramethylene glycol, hexamethylene glycol, neopentyl glycol and functional derivatives of these glycols, in which the amount of the homopolyester unit is at least 90 mol %, said film having a softening point at least 1°C. higher than its equilibrium softening point.

2. The film of claim 1 wherein said film is a biaxially oriented and post heat-treated film.

3. The film of claim 1 wherein said polyester resin (2) is a polyester resin not containing a tertiary proton in its structural units.

* * * * *